Figure 10:
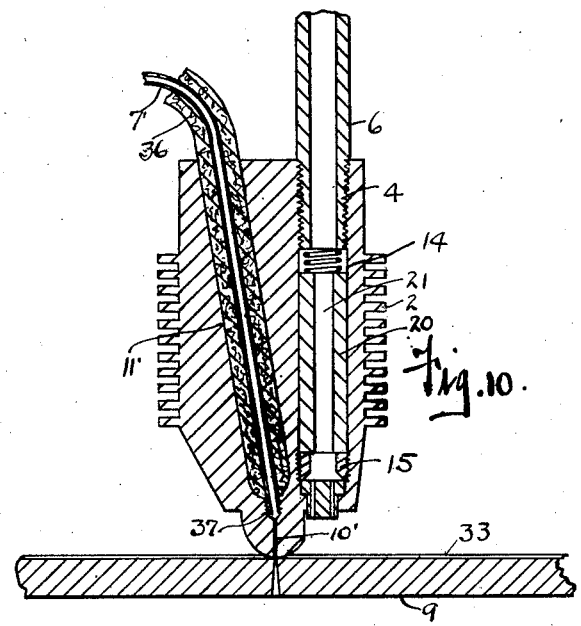

March 13, 1928.  
E. A. JOHNSON  
1,662,115  
METHOD OF SLOTTING METAL PLATES  
Filed July 6, 1926  
3 Sheets-Sheet 1
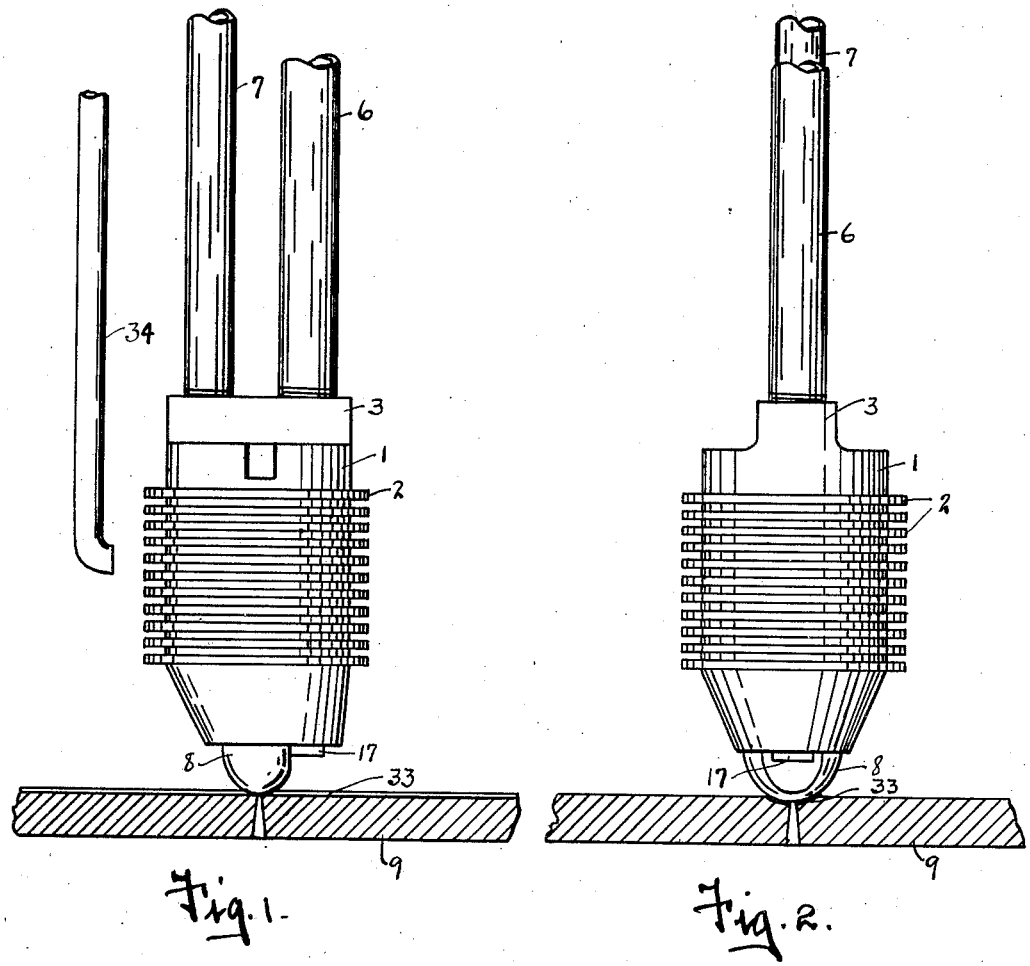

March 13, 1928. 1,662,115
E. A. JOHNSON
METHOD OF SLOTTING METAL PLATES
Filed July 6, 1926 3 Sheets-Sheet 2
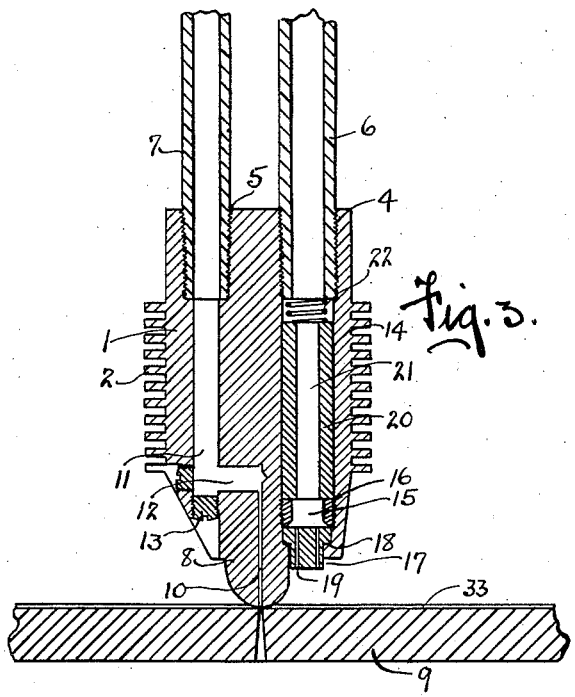
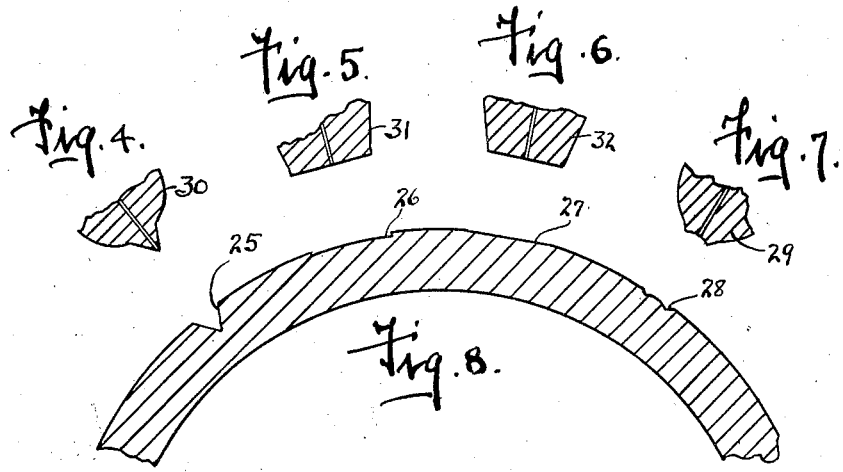
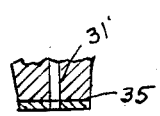
Edwin A. Johnson INVENTOR
Jesse R. Stone ATTORNEY March 13, 1928.

E. A. JOHNSON

METHOD OF SLOTTING METAL PLATES

Filed July 6, 1926      3 Sheets-Sheet 3

1,662,115

Edwin A. Johnson   Inventor

By Jesse R. Stone

Attorney

Patented Mar. 13, 1928.

1,662,115

UNITED STATES PATENT OFFICE.

EDWIN A. JOHNSON, OF HOUSTON, TEXAS, ASSIGNOR TO J. H. McEVOY & COMPANY, OF HOUSTON, TEXAS, A CORPORATION OF TEXAS.

METHOD OF SLOTTING METAL PLATES.

Application filed July 6, 1926. Serial No. 120,759.

The invention relates to cutting slots in metal plate, such as is employed in pipes, and similar structures, by use of a cutting torch.

It is an object of the invention to provide a process of cutting slots with a cutting torch whereby the said slots will be of the desired width and contour without the usual difficulties in the operation of the tool. It is also desired to be able to move the cutting torch in the proper path and to index it previous to starting.

A further object is to so construct the torch that it may be operated in direct contact with the work without the flame being extinguished or flaring back into the nozzle.

In the drawings herewith is illustrated one form which the cutting member may take, showing several embodiments of the cutting tip.

Figure 11:
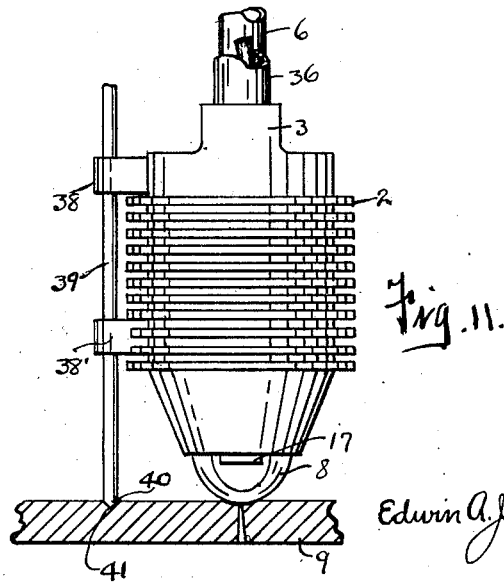

Fig. 1 is a side elevation of the torch, the nozzle being in contact with the work, which is indicated in section. Fig. 2 is a front elevation at right angles to the view shown in Fig. 1, Fig. 3 is a central vertical section through the cutting torch nozzle, as shown in Fig. 1. Figs. 4, 5, 6 and 7 are separate and distinct embodiments of the cutting tip for the torch nozzle. Fig. 8 illustrates a broken transverse section of a pipe with the surface prepared by grooves or otherwise to receive the contact of the cutting nozzle. Fig. 9 is a broken section of the cutting tip of the torch nozzle illustrating a removable shoe or plate thereon. Fig. 10 is a central section showing a means of insulating the oxygen passage, and Fig. 11 is a side elevation of the torch showing an indexing device thereon. Like numerals of reference designate like parts in all the views.

In carrying out my invention, I contemplate employing a cutting torch nozzle such as is usually used in cutting metal, said nozzle being modified to carry out the invention as set forth above. I, therefore, form a torch body, indicated at 1. This body is approximately cylindrical in shape centrally thereof and has radial fins 2 thereon spaced uniformly apart and intended for the purpose of the air cooling the body 1 of the torch. To allow connection for the gas, I provide an upward extension 3 extending diametrically across the upper end of the body and having openings 4 and 5 therein, threaded to receive the pipes 6 and 7 respectively.

At the lower end of the body 1, I form a rounded projection 8 constituting a nozzle intended to ride upon the plate or pipe indicated at 9. It is to be understood that the tip of the nozzle 8 may be of any desired shape, but in Figs. 1 to 3 inclusive, said tip is rounded off in an approximately hemispherical shape. This nozzle is shown as being formed integrally with the body 1, although obviously it may be made removable under certain circumstances. Centrally of the nozzle is a duct or channel 10 connecting with the passage 11 extending downwardly from the lower end of the recess 5. This passage is shown as being formed by boring an opening upwardly from the lower end to connect with the recess 5 and also by boring a passage 12 at right angles thereto to connect with the upper end of the duct 10, and by closing the openings from the lower ends of said passages by threaded plugs 13. This is for convenience in manufacturing.

The passage 11 and the pipes 7 are intended to convey oxygen for cutting purposes. The pipe 6 is intended to convey a fuel gas and oxygen mixture for preheating, and a passage 14 is connected at the lower end of the recess 4 and extended downwardly to a point spaced somewhat from the lower end where it is reduced slightly in diameter and threaded at 16 to receive the tubular nut 15. Below said nut is the burner tip 17 to allow the outlet of the gas for preheating purposes. The tip 17 is formed with a reduced lower end, the upper end resting upon a shoulder 18 formed at the lower end of the passage 14. The tip has a plurality of small ducts 19 therein through which the gas finds an outlet. To reduce the diameter of the passage 14, I place within the said passage a sleeve 20, which has an elongated opening 21 therein of the desired size. The sleeve 20 is held downwardly upon the upper end of the tubular nut 15 by a spring 22 bearing between the lower end of the pipe 6 and the sleeve 20. It will be noted that the tip 17 is held in position by the nut 15, and the sleeve 20 above the same is held against movement by the spring, the said spring allowing adjustment, however, of the nut 15, as well as the pipe 6.

In the operation of a blow-torch of this character for cutting narrow slots in pipe or plate, it is necessary that the work be preheated by the gas mixture so that the contact of the oxygen with the plate may cause immediate oxidation and cutting away of of the plate. With nozzles of this nature, as now constructed, some difficulty is ordinarily encountered in placing the nozzle too close to the pipe, the result being with the usual nozzle that the outlet for the gas is obstructed by its close proximity with the work so that the flame is extinguished or flared back in the body of the nozzle. To overcome this, I place the burner tip 17 directly in front of the nozzle for the oxygen so that as the nozzle is moved along the plate, the nozzle may ride directly upon the surface of the pipe and in close contact therewith and still allow a clear outlet for the preheating gas. This avoids the extinguishing of the preheating jet and also serves to form a narrower and also a cleaner cut by the oxygen issuing from the nozzle 8.

In using the nozzle as I have shown and described, I find it of material value in some cases to machine the surface of the plate or pipe, which is to be cut by the torch. A groove may be formed in the pipe along which the torch nozzle is to travel. This groove may be a downwardly tapered groove, such as shown at 25 in Fig. 8; or it may be a groove such as is shown at 26 with vertical sides and shallow depth. It may even be formed by flattening or grinding off the surface 27 along which the torch nozzle is to pass. At 28 I have shown a still different form of track or groove in which the nozzle 29 co-operating therewith may pass. In each case, the nozzle indicated at 30, 31 and 32 is formed at its forward end to contact with and move along the path formed in the work to co-operate therewith. It is understood, of course, that these prepared surfaces upon the work may be done by any sort of machining, such as cutting with a milling tool, grinding, or by the use of the lathe or similar tool, the idea being to prepare the surface of the plates or pipe so that the nozzle of the torch may contact directly with, and ride upon, the plate which is to be cut, and the prepared surface is formed to interfit with the tip of the nozzle. In Fig. 3, for example, the groove 33 is contemplated as being rounded in shape so that the tip of the nozzle 8 may fit closely therein.

A difficulty usually experienced with a cutting torch of this character is that of overheating of the body of the torch. By forming the body with the radial fins 2 thereon, I dissipate the heat to a large extent so that this difficulty is materially reduced. I may also place, adjacent to the cutting torch, a pipe 34 through which cold air or other cooling fluid may be directed against the body of the torch and thus further assist in the cooling thereof. Owing to the tendency of the tip of the nozzle 8 to overheat and wear, it is desirable, in some installations, to provide a wear tip secured, removably or otherwise, to the forward end thereof. In Fig. 9 I have shown a nozzle 31' having on the forward end thereof a plate 35 which may be secured to the forward face of the nozzle by welding or by any other well known equivalent, and this plate may be made of some heat resisting and wear resisting material, such as nichrome.

The oxygen, which is employed in cutting torches of this character, is under high pressure, and when it issues from the nozzle of the torch, it expands and is cooled to a very low temperature. It is found that when the oxygen is thus cooled, oxidation is retarded and the slot cut in the plate or pipe is flared out laterally so that it is too wide and irregular.

I have found that this is overcome by heating of the oxygen.

In order to conduct preheating oxygen within a cutting torch of this character satisfactorily, I find it necessary to insulate the pipe conducting the oxygen. In Fig. 10 the oxygen pipe is indicated at 7' and this pipe is covered by a layer of heat insulating material 36. To accommodate the pipe and the heat insulating coating, the passage 11' is placed in an inclined position in the head of the nozzle, as shown in Fig. 10 and the heat insulating material is extended as far down toward the tip of the nozzle as practicable. Below the enlarged channel 11' the lower end of the pipe 7' is threaded at 37 within the torch nozzle and connected with the passage 10' leading to the point of the tip. By thus heat insulating the oxygen passage the torch may be handled by the usual method and no difficulty experienced. It is understood, of course, that the oxygen in the pipe may be preheated in any desired manner or with any desired type of apparatus.

In beginning the cutting of a slot in the pipe, it is desirable to place the tip of the nozzle accurately over the point where the cut is to be begun. If the cut is to start at an opening the tip must register therewith so that the gas will pass directly into the opening without mutilating the edges thereof. To do this and to position the torch with relation to other slots, I employ an indexing means. In Fig. 11 such an index device is shown. I form upon one side of a nozzle 2 projecting lugs 38 and 38', said lugs having aligned openings therein to slidably receive a pin 39. This pin has its lower end 40 pointed to fit within a recess 41 in the pipe or plate which is to be cut. It is to be understood that the pipe will be prepared for cutting before the nozzle is used and when the point is located on the pipe from which the cutting is to start, then the indexing recess 41 is formed at the predetermined distance from the point. The index means 39 is then fitted within the recess in the pipe and the nozzle is moved accurately into position over the starting point. This indexing means is for use particularly with preheating jets surrounding the cutting jet, of the ordinary commercial type. In use, the approximate spot where the cutting is to begin is first preheated. Then the index is fixed and the oxygen turned on and the pin withdrawn at one operation.

In the operation of the torch for carrying out my improved process, the gas mixture for preheating the surface to be cut is directed through the gas tip 17 and the burning gas flame will be directed upon the surface so as to heat the said surface directly in front of the moving nozzle 8 through which the oxygen gas is directed. By placing the top of the nozzle directly upon the surface of the plate and moving it along the track prepared therefor upon the surface of the plate or pipe, I produce a narrow cut through the work which gradually diverges toward the opposite side of the plate. By thus adapting the nozzle to ride upon the pipe, which has previously been impracticable, I am enabled to perform the cutting operation much more rapidly and neatly than can be done by previous processes old in the art, and am also able to accurately control the gauge of the slot.

Having thus described my invention, what I claim as new and desire to protect by Letters Patent is:

1. A process of slotting metal plate or pipe comprising cutting in said plate a groove shaped to receive the nozzle of a cutting torch, preheating the surface along said groove, placing the torch nozzle directly in contact with the grooved surface to be cut, and moving the nozzle along said groove.

2. A process of slotting metal plate, comprising machining the surface along the area to be slotted, preheating said surface, placing a cutting torch nozzle in direct contact with said surface, and moving the nozzle in the path desired.

3. A process of slotting metal plate with a cutting torch, comprising forming the cutting torch nozzle to fit the surface to be slotted, preheating the surface to be slotted, placing the nozzle in direct contact with said surface and moving it along the path desired.

4. A process of slotting metal plate with a cutting torch comprising cutting in said plate a groove shaped to receive the nozzle of the torch, placing the torch nozzle in contact with said groove and moving the said nozzle along said groove.

5. A process of slotting metal plate, comprising preparing the surface along the area to be slotted, preheating the said surface, placing the tip of a cutting torch nozzle in direct contact with said surface so that said nozzle will ride on said plate, and moving the nozzle in the path desired, thereby controlling the width of the slot to be cut.

In testimony whereof I hereunto affix my signature this 1st day of July, A. D. 1926.

EDWIN A. JOHNSON.